Figure 1:
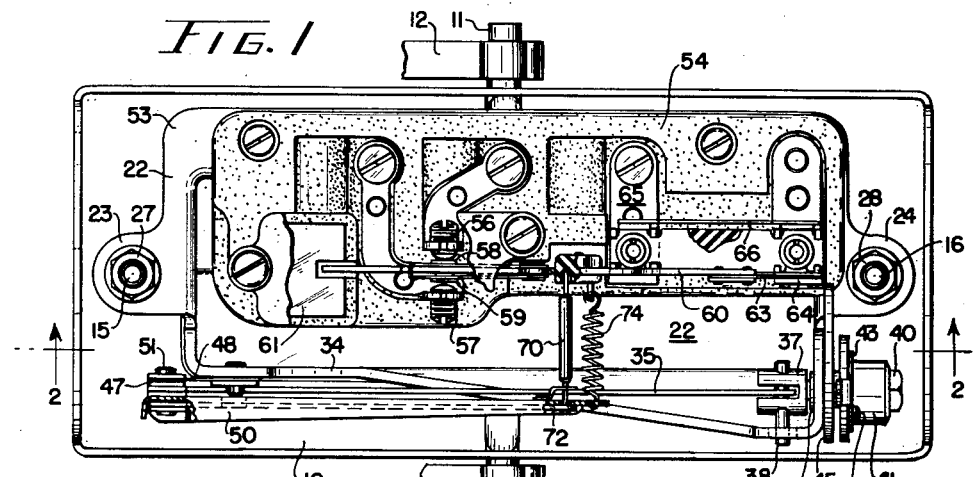

June 9, 1953  P. F. SHIVERS  2,641,667
SURFACE THERMOSTAT
Filed Feb. 23, 1950

INVENTOR.
PAUL F. SHIVERS
BY George H. Fisher
ATTORNEY

Patented June 9, 1953

2,641,667

UNITED STATES PATENT OFFICE 2,641,667

SURFACE THERMOSTAT

Paul F. Shivers, Edina, Minn., assignor to Minneapolis-Honeywell Regulator Company, Minneapolis, Minn., a corporation of Delaware Application February 23, 1950, Serial No. 145,773

10 Claims. (Cl. 200—137)

This invention relates to devices adapted to sense the surface temperature of a body and more particularly to a thermostat responsive to the surface temperature of a fluid container.

An object of the invention is to provide a surface thermostat having provision for assuring good heat transfer between the thermal element and the surface whose temperature is being sensed so that the thermal element of the thermostat will follow closely the temperature of the surface. To this end the temperature sensitive portion of the device is resiliently mounted within a frame or casing which is suitably secured to the surface, the temperature sensitive portion being biased into engagement with the surface to assure good heat transfer therebetween.

Another object of the invention is to provide a thermostat in which the temperature sensing element and switch or other control element actuated thereby are movably mounted as a unit within a casing, the casing having an opening through which the contacting or temperature pick-up surface of the sensing element is biased to engage the surface to which the casing is attached. The pick-up surface may be a portion of a temperature sensitive element or may be part of a member adapted to transmit heat thereto.

Another object is to provide a thermostat responsive to the temperature of a surface in which the thermostat proper is carried within a casing in a manner to afford minimum conduction of heat between the thermostat and the casing in order to minimize the effect of casing temperature on the response of the thermostat. In addition, the casing also engages the surface whose temperature is being sensed separately from the thermostat so that casing temperature will also tend to follow the temperature of the surface independently of the thermal element, thereby minimizing discrepancies due to heat exchange between the thermostat and casing due to radiation and convection. This arrangement of the thermostat within the casing both increases the sensitivity of the device to rapid changes in surface temperature and minimizes the effect of changes in ambient temperature on the control point of the device.

Another object is to provide a surface thermostat of the type in which the sensing element is of the linear expansion type and is held directly in engagement with the surface with a predetermined force that is independent of the force with which the casing is clamped to the surface, thereby permitting relative movement between the element and surface but assuring good heat transfer therebetween. If the thermostatic element were to be held against the surface with a force involving the variables of each installation the ideal force between element and surface would seldom be obtained, and in some cases excessive tightening would result in actual distortion of the element with a resulting change in calibration.

A further object is to provide a surface mounted thermostat having a linearly expanding element so connected to a relatively non-expansible element that distortion of the elements due to changing force therebetween is minimized.

Figure 2:
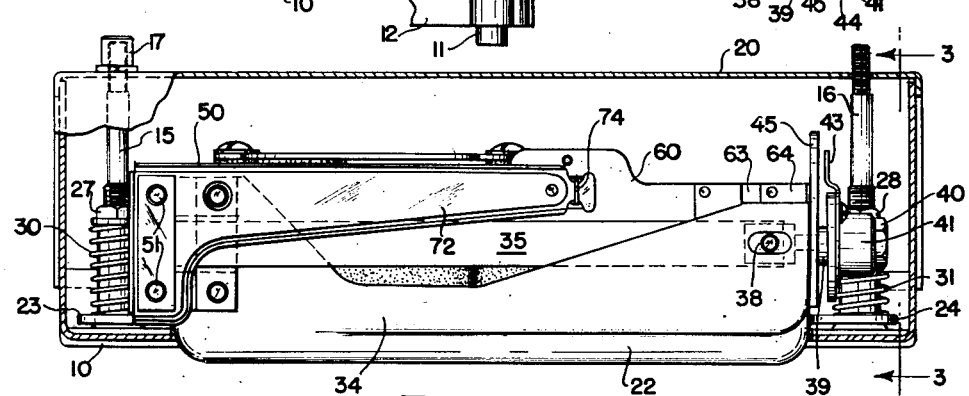
Figure 3:
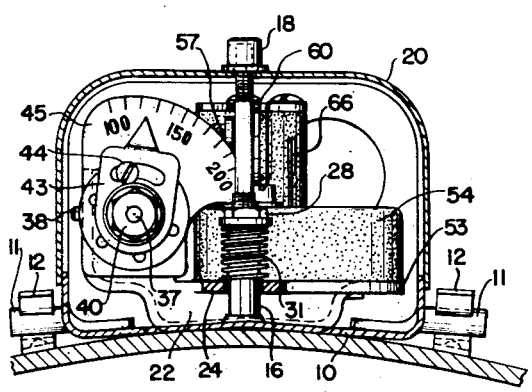
Figure 4:
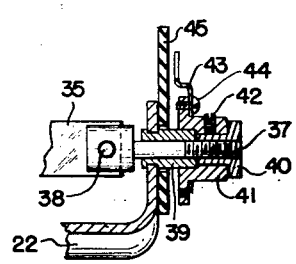

Other objects will be apparent from the following written description and claims, and from the drawing, in which Figure 1 is a plan view of a surface thermostat with the cover removed, Figure 2 is an elevation taken with the casing sectioned substantially on line 2—2 of Figure 1, Figure 3 is a section taken substantially on line 3—3 of Figure 2, and Figure 4 is a fragmentary section of the adjusting mechanism.

The illustrative embodiment of the invention is a surface mounted thermostat designed particularly for controlling the supply of electrical energy to a cylindrical hot water storage tank such as is used to supply domestic hot water. The device includes a generally rectangular box shaped frame 10 having a V-shaped surface adapted to engage a cylindrical tank surface. In order to secure the frame so that the V-shaped surface is in engagement with the tank surface a pair of laterally extending projections 11 are adapted to be engaged by spring clips 12 attached to the surface of the tank or, if desired, the projections 11 may be secured to the tank by means of metal straps encircling the tank. In any case the frame 10 is secured to the surface of the cylindrical tank with the line formed by the two intersecting planes forming the V-shaped surface parallel to the cylindrical axis.

Adjacent either end of the frame 10 and extending from the contacting portion is a pair of parallel posts 15 and 16. These posts may be riveted to the frame or otherwise suitably attached thereto at their lower ends. The upper ends of the two posts are threaded to receive nuts 17 and 18 which serve to secure a cover 20 in place on the frame 10. The frame 10 together with the cover 20 forms an enclosure for the thermostat proper to be described hereinafter.

A thermostatic member 22 formed of relatively highly expansible metal such as aluminum is provided with ears 23 and 24 at either end. The ears 23 and 24 have openings therein of somewhat larger diameter than the posts 15 and 16 through which the posts pass to slidably mount the thermo element with respect to the frame. The expansible element 22 includes the box like portion extending downwardly from the ears 23 and 24, the lower surface of this portion being in the form of a V having substantially the same angle between intersecting plane surfaces as the surface engaging V-shaped portion of the frame 10. The frame has an opening therein to receive the surface contacting portion of element 22. Posts 23 and 24 are threaded intermediate their length to receive nuts 27 and 28 respectively which serve as abutments for a pair of helical springs 30 and 31 which surround the lower portions of the posts and act in compression between the nuts and the ears 23 and 24. When the thermostat is not mounted on the tank the springs 30 and 31 will hold the element 22 in the position shown in Figure 2 with the lower portion of the element extending through the opening in the frame 10. When the frame is secured to the surface of a tank, element 22 will be forced inwardly to the position shown in Figure 3 with the contacting surfaces of the frame 10 and the element 22 in alignment. In the illustrative embodiment posts 15 and 16 are provided with a shoulder intermediate their lengths against which the nuts 27 and 28 are tightened, and the force supplied by the springs 30 and 31 to the element 22 when in operative position is determined by proper selection of springs. However, an alternative construction would provide for adjustment of the force of these springs by adjustment of nuts 27 and 28 on posts 15 and 16. Sufficient clearance is provided between the ears 23 and 24 and the posts 15 and 16 to allow for variation in expansion of the frame 10 and the element 22 and also to assure proper alignment of the V-shaped surface of the lower portion of the element 22 on the cylindrical tank surface.

The expansible member 22 has a portion 34 extending generally normal to the contacting surface thereof, which portion cooperates with a relatively non-expansible element 35, the relative movement therebetween being utilized to actuate a switch on changes in temperature as will appear hereinafter. It will be noted that the non-expansible element 35 is outside the element portion 34 at the left hand end of the thermostat but inside this portion at the right hand end thereof. Intermediate these ends the portion 34 is of reduced height to accommodate the nonexpansible element 35. It will be evident that an aperture in the portion 34 would serve the same purpose.

The right hand end of the low expansion element 35 is secured to the head of a screw 37 by means of a pin 38 which also extends through a slot in the portion 34 of the expansible element to prevent turning of the screw 37. As seen in Figure 4, a bushing 39 is secured in the thermal element portion 34 and serves as an abutment for a nut 40 that is screw threaded on the end of the screw 37. Adjustment of the nut 40 changes the relative position of the right hand end of the expansible element 22 and the non-expansible element 35. A collar 41 is secured to the nut 40 by means of a set screw 42. A pointer 43 is secured to the collar 41 by means of a screw 44 and cooperates with indicia of temperature on a scale plate 45 secured to the right hand end of the element 22. As seen in Figure 3 the pointer 43 has an arcuate slot to receive the screw 44 thereby permitting a range of adjustment between the pointer and the collar for calibration purposes. The screw 44 may be inserted in a plurality of threaded holes in the collar 41 thus permitting the pointer 43 to be located at any angle with respect to the collar 41. In general, rough calibration of the device will be obtained by adjustment of the collar 41 with respect to nut 40 and fine calibration obtained by proper location of the pointer 43 with respect to the collar 41.

As seen in Figure 1, the left hand end of the non-expansible element 35 is secured, through a spacer 47, to a spring strip 48 which in turn is secured to the left hand end of the portion 34 of expansible element 22. An actuating arm 50 is also secured to the left hand end of non-expansible element 35 and to the spring strip 48 by rivets 51. The non-expansible element 35 is of rather thin material and itself acts as a resilient strip so that relative movement between expansible element and non-expansible element will cause pivotal movement of the actuating arm 50 about an axis determined by spring strip 48. Rise in temperature of the expansible element 22 will cause counterclockwise pivotal movement of actuating arm 50.

The expansible element 22 is flanged as at 53 forming a surface in line with the ears 23 and 24. To this flanged portion is secured a ceramic block 54 which acts as a terminal block and also carries the switch mechanism. The switch comprises a pair of stationary contacts 56 and 57 and a pair of movable contacts 58 and 59 which are carried on the switch arm 60 by means of suitable resilient pressback blades. The left hand end of switch arm 60 operates between the poles of a permanent magnet 61 to provide snap action, the switch arm being made of magnetic material to act as an armature. A spring strip 63 of electrically conducting material interconnects the right hand end of the switch arm 60 and a bracket 64 which is secured to the ceramic block 54. Electrical connection between the bracket 64 and a terminal 65 is through a spring strip 66 which is biased to a position out of engagement with a portion of bracket 64 but which is held in engagement therewith by solder that will melt under overload conditions.

A pin 70 interconnects an insulating block carried by the switch arm 60 and the right hand end of actuating arm 50. The pin 70 engages a spring strip 72 lying along the actuating arm 50 under normal conditions but separable therefrom when the position of the actuating lever 50 is such that movable contact 58 would otherwise assume a position beyond the stationary contact 56, the action on the spring 72 being that of a strain release. A coil tension spring 74 interconnecting the switch arm 60 and actuating arm 50 assures that the switch arm will follow the arm 50 to move the lever in the opposite direction, the spring 74 acting as a strain release on excessive movement of the actuating arm 50 in a clockwise direction. The spring strip 48 interconnecting expansible element 22, non-expansible element 35 and actuating lever 50 has a normal shape such that the arm 50 will assume a position rotated clockwise from the position shown in Figure 1. This places the non-expansible member 35 in tension at all operating conditions of the device. It will be seen that expansion and contraction of the expansible element 22 with respect to the nonexpansible element 35 will result in actuation of the arm 50 to actuate the switch arm 60. The temperature at which such actuation takes place will depend on the adjusted position of the right hand end of the non-expansible element 35 and the expansible element 22 as determined by the position of pointer 43 on the scale 45.

It will be seen that by providing V-shaped contact surfaces on both the frame 10 and on the expansible element 22 that the device is adapted for a wide range of tank diameters with good thermal contact. By providing the same shape of contact surface on the frame and on the expansible element the springs 30 and 31 will be compressed the same amount regardless of the diameter of the tank. Since the expansible element 22 will expand and contract more than the ordinary steel tank to which it is applied, some relative movement between the element and tank will take place between the element and the tank. The force between element 22 and the tank should be sufficient to assure good conductivity therebetween but should not be so great as to prevent relatively free expansion and contraction of the element 22. Proper force is assured since the springs 30 and 31 determine the contacting force rather than the force with which the frame 10 is secured to the tank.

The expansible element 22 is designed so that it may be formed as a sheet metal stamping so as to have relatively low mass and therefore relatively low heat capacity assuring that it will follow the tank temperature with reasonable accuracy. The manner in which the non-expansible element 35 is connected to the expansible element 22 assures sufficient stiffness of element 22 so that variation in tension of the element 35 due to switch operating differential will not result in strain of the element 22 rather than in proper switch actuation.

The only contact between the frame 10 and the expansible element 22 when in operative position is through the springs 30 and 31 and possibly some minor contact with the posts 15 and 16. Since the frame and cover will be at the different temperature than the expansible element due to ambient temperature conditions, reduction in heat transfer therebetween is a great advantage. Since the frame 10 is absorbing heat from the tank surface independently of the element 22 it will tend to follow tank temperature, thereby reducing the difference between the space temperature within the cover 20 and the temperature of the expansible element 22.

The various features of the described surface thermostat contribute to provide a sensitive device of relatively small size. Many variations of the described invention will be apparent to those skilled in the art and it is understood that I am to be limited only by the scope of the appended claims.

I claim as my invention:

1. In a device responsive to the temperature of a surface, a frame including means for mounting said frame on the surface, a pair of posts secured to said frame and extending outwardly from the surface engaging portion of said frame, a thermostat slidably mounted on said posts, and spring means acting between said posts and said thermostat biasing said thermostat toward the surface.

2. In a thermostat responsive to the temperature of a surface, an expansible element, a non-expansible element and a switch carried by said expansible element, a switch actuator interconnecting said elements and said switch, a frame surrounding said expansible element and having an opening to receive a portion of said expansible element, and spring means acting between said expansible element and said frame biasing said expansible element to a position extending through the opening in said frame.

3. In a thermostat responsive to the temperature of a surface, an expansible element, a non-expansible element and a switch carried by said expansible element, a switch actuator interconnecting said elements and said switch, a frame surrounding said expansible element and having an opening to receive a portion of said expansible element, means on said frame adapted to secure said frame to a surface the temperature of which is to be sensed, and spring means acting between said expansible element and said frame biasing said expansible element to a position extending through the opening in said frame, said spring means biasing said expansible element against the surface when said frame is secured thereto.

4. In a temperature sensitive device, a frame adapted to be secured to a surface, said frame having an opening therein in the portion adjacent the surface against which it is to be mounted, a pair of posts extending outwardly from said frame portion at opposite ends of the opening, a thermostat slidably mounted on said posts and having a temperature sensitive portion lying within the opening in said frame, springs acting between said posts and said thermostat, and a cover for said frame inclosing said thermostat, said posts engaging said cover for securing said cover to said frame.

5. In a device for responding to the temperature of a cylindrical surface, a frame including a portion having a V-shaped surface adapted to engage a cylindrical surface the temperature of which is to be sensed, said portion of said frame having an opening therein, a thermostat including a portion having a V-shaped temperature sensing surface, said portion being adapted to extend through the opening in said frame to engage the cylindrical surface the temperature of which is to be sensed, a post carried by said frame substantially in line with the apex of said V-shaped surface adjacent each end of the opening in said frame, said thermostat being guided by said posts, and springs acting between said post and said thermostat, and biasing said thermostat toward a position in which the V-shaped surface thereof extends beyond the V-shaped surface of said frame.

6. In a thermostat adapted to respond to the temperature of a surface, an elongated relatively expansible member having a first portion including an elongated contact surface adapted to be secured in engagement with a surface the temperature of which is to be sensed, said expansible element having a second portion disposed generally normal to the first portion and substantially coextensive with the contact surface, a relatively nonexpansible member disposed substantially coextensive with the contact surface, a connection between one end of said nonexpansible member and one end of said expansible member, a switch mounted on said expansible member, and a switch actuating lever interconnecting said switch and the opposite ends of said members, the two ends of said nonexpansible member being disposed adjacent the second portion of said expansible member and on opposite sides thereof.

7. In a thermostat responsive to the temperature of a surface, an expansible element including a portion having an elongated recess adapted to engage a cylindrical surface, a non-expansible element and a switch carried by said expansible element, a switch actuator interconnecting said elements and said switch, a frame surrounding said expansible element and having an opening in the surface engaging portion thereof to receive the surface engaging portion of said expansible element, said surface engaging portion of said frame being shaped to engage the cylindrical surface to assure alignment of said recess in said expansible element with a longitudinal element of the cylindrical surface, and spring means acting between said expansible element and said frame biasing said portion of said expansible element to a position extending through the opening in said frame.

8. In a thermostat responsive to the temperature of a surface, temperature responsive means including a portion having an elongated recess adapted to engage a cylindrical surface, a switch carried by said temperature responsive means and actuated thereby, a frame surrounding said temperature responsive means and said switch and having an opening in the surface engaging portion thereof to receive the surface engaging portion of said temperature responsive means, said surface engaging portion of said frame being shaped to engage the cylindrical surface to assure alignment of the recess in the surface engaging portion of said temperature responsive means with a longitudinal element of the cylindrical surface, and spring means acting between said temperature responsive means and said frame biasing the surface engaging portion of said temperature responsive means to a position extending through the opening in said frame.

9. In a thermostat responsive to the temperature of a surface, temperature responsive means including a portion having a V-shaped surface adapted to engage a surface the temperature of which is to be sensed, a switch carried by said temperature responsive means and actuated thereby, a frame surrounding said temperature responsive means and said switch and having an opening through which the V-shaped surface portion of said temperature responsive means may extend, means for securing said frame against the surface the temperature of which is to be sensed, means on said frame guiding the movement of said temperature responsive means with respect to said frame but permitting limited freedom of movement therebetween to permit engagement of the surface by elements on both sides of the V-shaped surface, and spring means acting between said temperature responsive means and said frame biasing the V-shaped surface to a position extending through the opening in said frame and into engagement with the surface the temperature of which is to be sensed.

10. In a thermostat responsive to the temperature of a surface, temperature responsive means including a portion having a surface adapted to engage a surface the temperature of which is to be sensed, a switch carried by said temperature responsive means and actuated thereby, a frame surrounding said temperature responsive means and said switch and having an opening through which the surface portion of said temperature responsive means may extend, means for securing said frame against the surface the temperature of which is to be sensed, means on said frame guiding the movement of said temperature responsive means with respect to said frame but permitting limited freedom of movement therebetween to permit engagement of the surface by a plurality of points of the surface portion of said temperature responsive means, and spring means acting between said temperature responsive means and said frame biasing said surface portion of said temperature responsive means to a position extending through the opening in said frame.

PAUL F. SHIVERS.

References Cited in the file of this patent
UNITED STATES PATENTS

| Number | Name | Date |
| --- | --- | --- |
| 1,956,067 | Herz | Apr. 24, 1934 |
| 2,471,806 | Wilson et al. | May 31, 1949 |
| 2,496,715 | Hammell | Feb. 7, 1950 |
| 2,516,501 | Altman et al. | July 25, 1950 |